Figure 1:
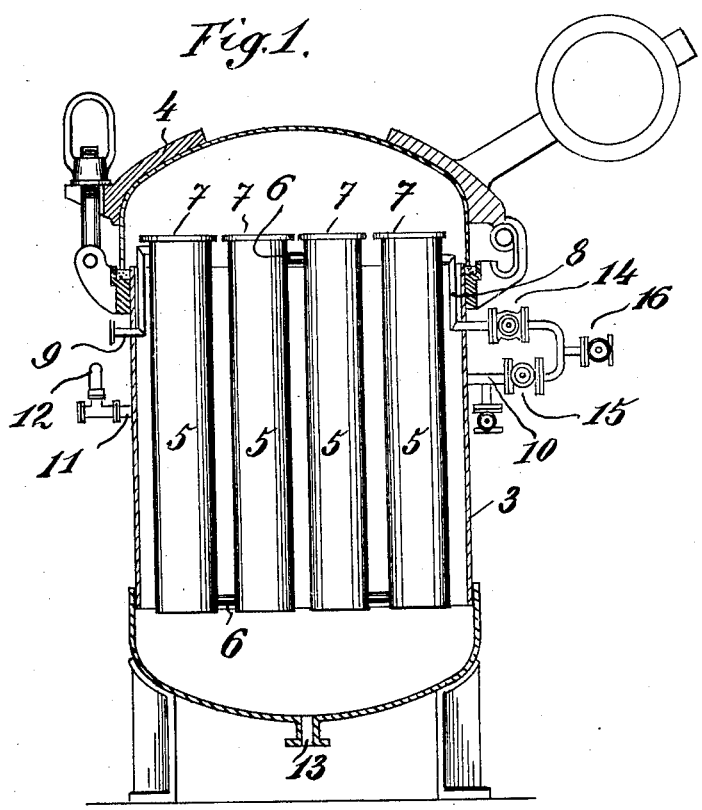

Aug. 15, 1933.    F MENGERING    1,922,488
PROCESS AND APPARATUS FOR PREPARING RESPIRATION BATHS
Filed Jan. 28, 1930    2 Sheets-Sheet 1

Inventor
Franz Mengering
By Knight Bros
attorneys

Aug. 15, 1933.  F. MENGERING  1,922,488
PROCESS AND APPARATUS FOR PREPARING RESPIRATION BATHS
Filed Jan. 28, 1930  2 Sheets-Sheet 2
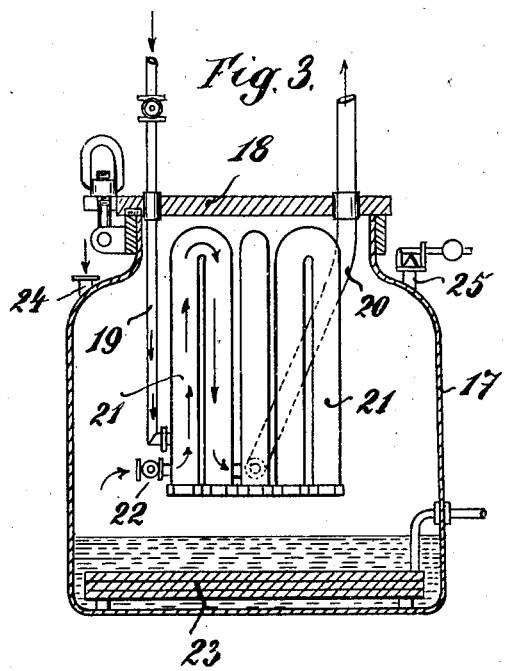
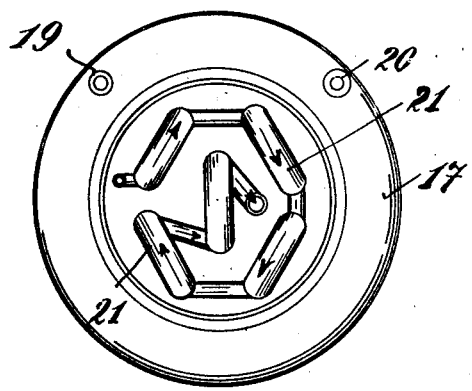

Patented Aug. 15, 1933

1,922,488

UNITED STATES PATENT OFFICE 1,922,488

PROCESS AND APPARATUS FOR PREPARING RESPIRATION BATHS

Franz Mengering, Magdeburg, Germany

Application January 28, 1930, Serial No. 424,072, and in Germany January 31, 1929

6 Claims. (Cl. 167—3)

As is well-known, natural products of mineral, vegetal, or animal origin, in many cases, contain constituents which from ancient times have been used for therapeutic and strengthening purposes for man and animals. For this reason, the extraction of these medicinal and invigorating drugs from the different natural products has been common. These were marketed in liquid or solid form in order to dispense them to patients for internal or external use either as unitary medicines or else as constituents of medicines. Thus extracts or powders have been prepared especially from many types of plants, such as from the wood, the bark, and the leaves or needle-leaves of trees, which extracts or powders contain the medicinal or invigorating substances and were employed in the desired suitable manner.

Now it has been found by the inventor that, more particularly for the preparation of respiration baths, much more satisfactory results can be obtained by using the medicinal substances contained in the natural products in "statu nascendi" or nascent state and in an actually gaseous form, but not in atomized or vaporous form obtained by mechanically atomizing the substances, or by evaporation and volatilization in open vessels.

According to my invention the medicinal and invigorating substances are extracted immediately before being used, under high pressure and at temperatures above 100 degrees C. The substances are applied in this gaseous state without being condensed previously or treated in any other manner to adapt it for long storage. It is only by this method that it is possible to utilize most advantageously all healing substances, even the most highly volatile ones, and to cause the healing or invigorating substances to arrive in the extreme branchlets of the bronchial ways and lungs. There they are transferred to the circulating blood and become thus capable of exerting their healing effect on the nidus. A respiration of the gaseous agent by the pores may further be attained at the same time in a lower degree.

Thus for instance the healing substances contained in conifers such as pine, fir, spruce etc. were extracted and applied to the patient immediately in statu nascendi in the form of respiration baths. With this treatment it appeared that complaints due to the presence of uric acid such as rheumatism, gout and ischiagra and further illnesses due to cold such as influenza, cough, nasal catarrh, bronchitis, tussis convulsiva, and, finally, also asthma and pulmonary diseases could be cured very quickly.

My process and apparatus may as well be applied to any form of medicinal inhalation schemes and may be employed for the purification of the air in large meeting places where a great number of persons are confined for any length of time.

I prefer to extract the healing substances from the natural raw products when the latter are in a disintegrated condition and at temperatures above 100 degrees C. The healing substances thus obtained, being in suspension in the extraction agent, are supplied for respiration purposes to suitable apparatus, such as cabinets or rooms. As to the temperatures to be employed, care must be taken that merely the healing and invigorating substances are extracted with no noxious constituents. In the extraction of vegetal substances, more particularly those contained in conifers of different kind, care must be taken therefore that poisonous constituents, such as methyl alcohol, are not extracted also. Thus it is necessary that the temperatures employed remain below the limits at which such noxious extraction takes place. An exact control of the temperatures is therefore one of the most important conditions of my new process. It appears that this control is effected advantageously by heating the natural raw products to the desired temperature above 100 degrees C., by means of an external source of heat, arranging these products so that they form individual charges disposed in series connection, and causing a gaseous or vaporous agent, also suitably heated to an adequately high temperature to flow therethrough to effect the extraction. When saturated steam is used for this purpose as heating means, then the desired temperature can be maintained with security by regulating the steam pressure which temperature can be exactly determined according to this pressure, while the preheating of the extraction means has the effect that even a temporary cooling is avoided so that no condensation within the apparatus can occur.

Figure 2:
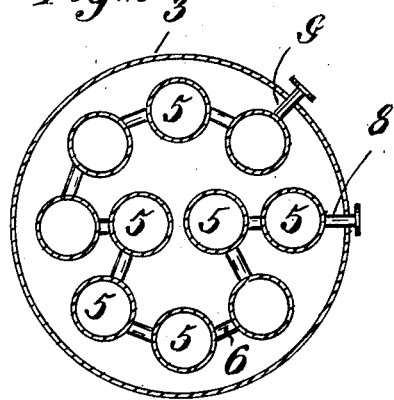

In order that my invention can be more readily understood, two embodiments of the apparatus adapted to carry out my process are diagrammatically illustrated by way of example in the accompanying drawings, in which Figure 1 is a vertical longitudinal section through the apparatus forming the first embodiment, Figure 2 is the corresponding cross section, Figure 3 is a vertical longitudinal section through the apparatus of the second embodiment, and Figure 4 is the corresponding top view.

Referring first to Figures 1 and 2, 3 denotes a pressure-resisting jacket that has a readily detachable tight cover 4 and contains a plurality of extraction vessels 5 which can be readily removed and are connected in series by means of intermediate pipes 6 arranged alternatively on the top and bottom. The vessels 5 further have readily removable tight covers 7. On one end of vessel battery thus formed is provided an inlet pipe 8 and on the other end an outlet pipe 9. The jacket 3 is heated by steam that enters through an inlet pipe 10 while the waste steam escapes at 13. On a socket 11 is mounted an adjustable safety valve 12 by the aid of which the desired steam pressure in the jacket 3 and thus the required temperature can be exactly adjusted. The water of condensation is likewise drawn off at 13. The inlet pipe 8 is connected to the steam supply pipe 10, a valve 15 and a reduction valve 14 being inserted in this connection by which latter valve the pressure of the steam entering through pipe 10 can be reduced. Besides, there is another socket 16 through which any desired gaseous agent or gaseous mixture can be fed. This enables to effect the extraction either by the steam alone or by a gas or gaseous mixture alone, or, finally, by a mixture of steam and gas or gas mixture.

The natural products are brought into the vessels 5 in prepared charges, then the covers 7 are closed and the pipes 8 and 9 connected, respectively, to the steam supply and an exhaust pipe. Thereupon the jacket 3 is tightly closed and heated by steam entering at 10. When the desired temperature is reached, then the desired extraction fluid, that is steam or gas or a mixture thereof, is supplied by opening valve 14. In order to obtain the lowest possible streaming velocity in the battery of vessels and thereby to effect the enriching of the passing fluid as completely as possible, as low a pressure is applied to force it through the battery, as is required to cause it to escape to the respiration cabinet or room. As to the steam, this reduction of pressure is effected by the reduction valve 14. Owing to the battery everywhere being surrounded by uniform temperature, the fluid forced at low pressure through it at once acquires the temperature corresponding to the steam pressure prevailing in the jacket 3 which in the instance of a pressure of 6 atmospheres above atmospheric a temperature of 165.5 degrees C would obtain. By this practice, the dissolved and extracted substances arrive at the place of consumption in gaseous state. When gases or mixtures are used, these fluids can be likewise heated previously to the desired temperature by means of any suitable heating apparatus (not shown). The extraction fluid flows through the first vessel 5 from top to bottom, enters the second vessel and passes through it from bottom to top and so on alternatively through all vessels 5, and escapes in most highly enriched state at 9 from where it is fed to inhalers, inhalation cabinets or the like.

As soon as all extractive matter has been extracted, the vessels 5 are charged anew and the operation may be repeated.

Complete extraction is guaranteed securely both by the heat supply being effected from outside whereby at any place of the battery the desired temperature is reached quite exactly and simultaneously, and by the subdivision of the raw material into comparatively small charges that are connected in series, and through which the extraction agent passes. The operator is enabled on the one hand to regulate the temperatures in accordance with the requirements of the specific raw material upon which he is operating, and on the other hand to extend the extraction to more highly boiling constituents, but to leave unextracted poisonous constituents which are dissolved and evaporated only at higher temperatures, by applying temperatures lying below this limit of dissolution.

An apparatus illustrated in Figures 3 and 4 resembles that shown in Figures 1 and 2 with the difference that the former is portable. The jacket 17 possesses a tightly closing cover 18 which has fixed on it by means of the supply pipe 19 and outlet pipe 20 the individual, inversely U-shaped vessels 21 that receive the raw material to be treated and are connected in series. On the bottom of the first vessel 21 whereinto the supply pipe 19 opens, is provided an adjustable spring valve 22 that opens toward the interior of the battery, controllable by a definite steam pressure, as soon as this pressure is reached in the jacket 17. Steam is raised for instance by means of an electric immersion heater 23 which evaporates the water in the jacket 17, or by direct heating. The immersion heater may be disk-shaped in such a manner that it is thrown out of operation automatically both with a determined steam pressure due to surface compression and due to metal expansion with a determined temperature which lies about 50 to 100 degrees C. above the normal working temperature. In this manner too high a pressure is avoided in the jacket and the immersion heater is protected from burning out when the water in jacket 17 has been completely evaporated. Water is supplied through a suitable inlet 24 while the desired pressure and temperature are regulated by means of an adjustable safety valve 25.

It is evident that my extraction process can be carried out by means of the last described apparatus in the same manner as described above. Owing to its compact construction and portability this apparatus is particularly well suited for individual inhalations to be made at home.

It is understood that the apparatus described form only examples of the manner in which my process can be realized and I do not confine my invention to these embodiments illustrated. On the contrary, any other extraction apparatus may be used to realize my process, provided that there is the possibility to supply heat to the starting material from outside, while the extraction proper can be made by any vaporous or gaseous means.

What I claim and desire to secure by Letters Patent, is:—

1. The process of preparing media for medicinal inhalation of vapor baths, comprising the heating of the raw materials containing medicinal constituents at a temperature above 100° C., and passing an extraction fluid over said materials to derive said constituents in a nascent state.

2. The process of preparing media for medicinal inhalation or vapor baths, comprising the heating of the raw materials containing medicinal constituents at a temperature above 100° C., and passing a heated extraction fluid over said materials to derive said constituents in a nascent state.

3. The process of preparing media for medicinal inhalation or vapor baths, comprising the heating of the raw materials containing medicinal constituents at a temperature above 100° C., and serially passing a heated extraction fluid over said materials disposed in a series to derive said constituents in a nascent state.

4. In a machine of the class described, a sealed container, a plurality of vessels completely surrounded by said container adapted to contain raw medicinal materials, means for maintaining a fluid heating medium within a predetermined pressure and temperature in said container surrounding said vessels, and means to introduce an extracting fluid into said vessels.

5. In a machine of the class described, a sealed container, a plurality of vessels completely surrounded by said container adapted to contain raw medicinal materials, means for maintaining a fluid heating medium within a predetermined pressure and temperature in said container surrounding said vessels, and means to introduce an extracting fluid comprising said fluid heating medium at a reduced pressure into said vessels.

6. In a machine of the class described, a sealed container, a plurality of vessels disposed in a series in said container adapted to contain row medicinal materials, means for generating steam in said container, means for admitting said steam in said series of vessels responsive to the pressure generated by said steam, said steam generating means adapted to be rendered inoperative in response to a predetermined pressure and temperature in said container.

FRANZ MENGERING.